United States Patent [19]

Mallek

[11] Patent Number: 4,568,271
[45] Date of Patent: Feb. 4, 1986

[54] METHOD AND SHAFT FURNACE FOR GASIFYING WASTE LIQUIDS CONTAINING ORGANIC COMPONENTS

[75] Inventor: Heinz Mallek, Linnich-Tetz, Fed. Rep. of Germany

[73] Assignee: Kernforschungsanlage Jülich Gesellschaft mit beschränkter Haftung, Jülich, Fed. Rep. of Germany

[21] Appl. No.: 626,308

[22] Filed: Jun. 29, 1984

[30] Foreign Application Priority Data

Jul. 2, 1983 [DE] Fed. Rep. of Germany ....... 3323981

[51] Int. Cl.⁴ .................... F27B 14/00; F23G 5/12; F27D 1/08; C07C 1/00
[52] U.S. Cl. .................................... 432/13; 110/229; 432/95; 585/240
[58] Field of Search .................. 432/13, 95; 110/229, 110/230, 231; 241/23; 585/240

[56] References Cited

U.S. PATENT DOCUMENTS 3,737,285 6/1973 Hicks .................................. 110/229
4,291,636 9/1981 Bergsten et al. .................... 110/229
4,498,909 2/1985 Milner et al. ........................ 110/229

Primary Examiner—John J. Camby
Attorney, Agent, or Firm—Frishauf, Holtz, Goodman & Woodward

[57] ABSTRACT

A waste liquid is dripped down into a shaft chamber 1 of a shaft furnace 2 at the bottom of which chamber is a rotating conical grate 3 on which is an incandescent bed of carbon-rich material 6 than can be supplied from the top of the shaft. Oxygen is supplied through holes 17 of a raised head 15 of the grate. The liquid, vaporized as it reaches the incandescent bed, is drawn through the bed 6 where it is gasified and where high molecular weight components are cracked, forming a gas mixture that is drawn off through the duct 18 at the bottom of the shaft while solid residues of the liquid collect in the bed 6 from which ashes pass through a peripheral gap 5 and drop down through the duct 18 to a collecting hopper 21. The gas mixture then flows upward through a second incandescent bed 24 of carbon-rich material, such as coke or wood charcoal, where the oxygen, exhausted along with the gas mixture from the shaft 1, maintains a temperature between 900° and 1000° C. There the remaining high molecular weight contents of the gas mixture are cracked, while entrained ash particles are held back by the bed of coals. A suction blower 20 pulls out a gaseous product useful as fuel.

16 Claims, 1 Drawing Figure

U.S. Patent    Feb. 4, 1986    4,568,271
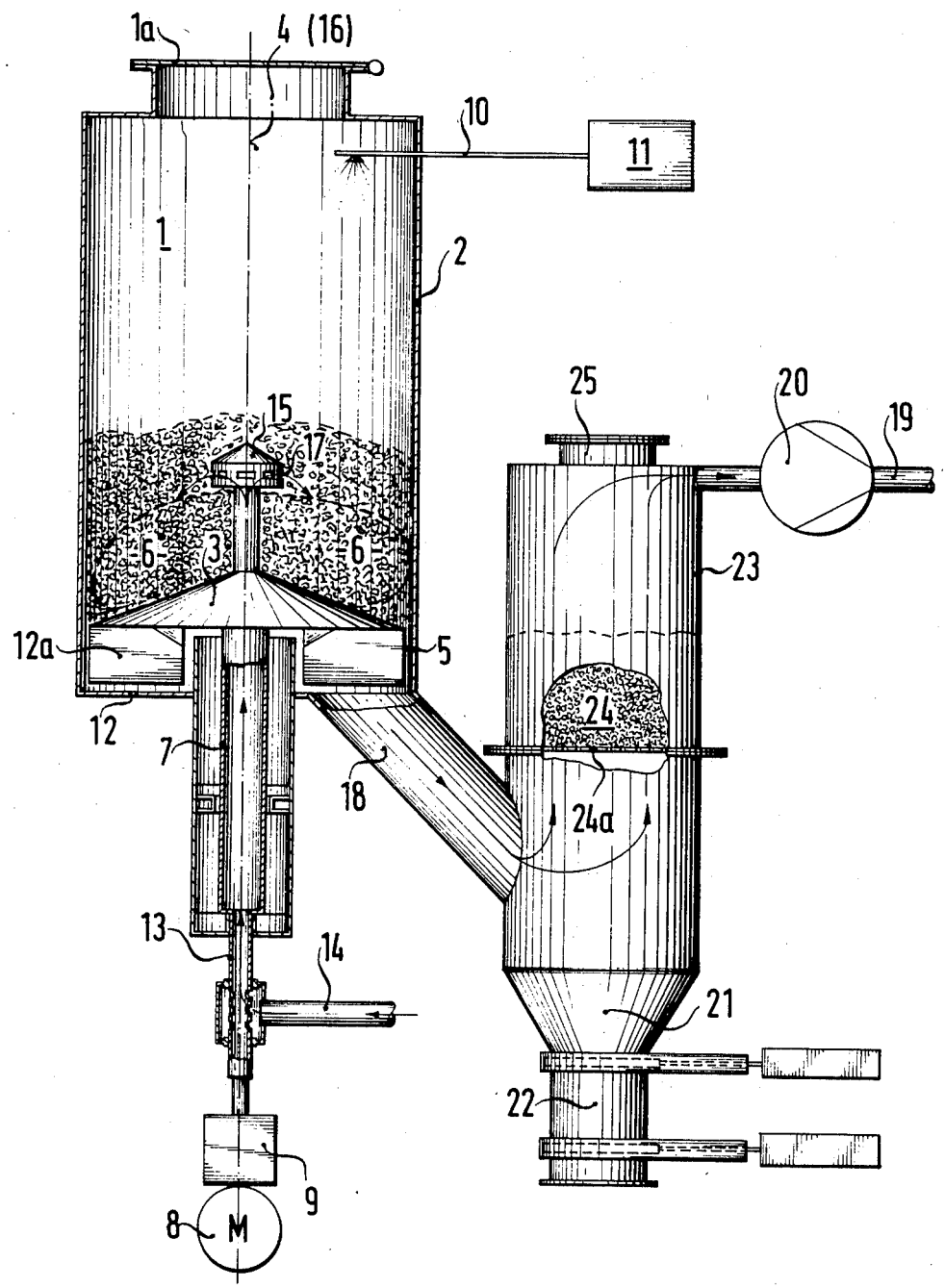

METHOD AND SHAFT FURNACE FOR GASIFYING WASTE LIQUIDS CONTAINING ORGANIC COMPONENTS

This invention concerns a method of gasifying the organic content of waste liquids and a shaft furnace for carrying out method.

Waste liquids of the above-mentioned kind include, for example, paint or lacquer residual liquids and suspensions which remain as soiled remainder liquids after brushing or spraying of paint on the workpieces to be covered. In painting and finishing rooms and spray chambers, such waste liquids and muds are produced in substantial quantities as waste. Residual amounts of paint that are not worth preserving for further use cannot be avoided in the manufacture of paints and lacquers. These include mistakenly compounded batches, for example.

Paint suspensions or oozes, sometimes after thickening, are disposed of or stored at special disposal or storage sites. That involves not only expense, but also the problem that fewer and fewer such sites remain available in the course of time because of their becoming progressively used up.

Similar difficulties are also involved in the case of waste pigments, varnishes and solvents.

SUMMARY OF THE INVENTION

It is an object of the present invention to provide a method and a furnace for disposing of waste liquids having organic components, which can be operated in an environment-friendly manner and also with recovery of energy. It is a further object that such a method and apparatus should be simple to carry out and operate.

According to the invention, the waste fluid is fed from above in suitable doses or at a suitable rate onto an incandescent combustion bed which vaporizes the waste liquid. Gaseous products and solid residual components are formed. The gaseous products are sucked down through the combustion bed and thereby heated to such an extent that high molecular weight organic gas phases are cracked.

It is preferred that the combustion bed should have at least one zone at a temperature in the region between 800° and 1000° C. through which the gaseous products flow.

An easily ignitable gase mixture is produced, having low molecular weight gas components, such as $H_2$, $CO$ and $CH_4$. The gas mixture drawn down out of the combustion bed can be utilized as a fuel gas for recovery of energy when supplementary oxygen is supplied for burning it.

The fuel gases drawn down out of the combustion bed is already to a great extent cleaned of the solid residual components produced in the conversion of the waste liquid. The residual components form a part of the combustion bed and are removed out of the bed as ashes.

It is advantageous to subject the gaseous products to a first separation of ash particles and then to lead them through a following cracking and cleaning stage operating at a temperature between 900° and 1000° C. In the latter stage, high molecular weight organic gas components still contained in the gas mixture flowing away from the first combustion bed are split up. Concurrently, the fuel gas is again cleaned of such dust and other suspended particles as may be still carried along with it. This takes place in a combustion bed through which the gaseous products flow. A fuel gas containing little tar and oil flows out of the cracking and cleaning stage just mentioned.

Degassed carbon-rich material, for example, coke or wood charcoal, is used for constituting the incandescent combustion beds. Thus the combustion bed may be referred to in more colloquial language as a bed of glowing coals. It is advantageous to include grinding balls additionally in the first combustion bed. These serve to reduce the size of the pieces of material used to constitute the combustion bed.

By spraying the waste liquids over the glowing coals bed of the first cracking stage, and by the subdivision of the liquid into small drops in that way, the vaporization of the liquid is facilitated and a uniform distribution in the shaft chamber and over the bed of coals is obtained.

The shaft furnace, in accordance with the invention, has a shaft chamber in its upper portion that can be closed off gas-tight and which is bounded at its bottom by a grate which serves to support a bed of glowing coals. The grate is rotatably moveable for rotation or swinging in such a way that a gap passage remains between its rim and the furnace shaft wall for the passage of ash particles that are carried out of the bed of coals by gravity. A supply duct for the waste liquid to be spread over the top of the incandescent bed of coals discharges in the furnace shaft above the incandescent bed. A gas supply line leading into the shaft serves for the supply of oxidizing gas into the bed of coals. The gas mixture produced by vaporization and gasification of the waste liquid in the incandescent bed is drawn off by suction in the lower region of the shaft furnace. Suction means required for this purpose are located below the grate. The gas mixture drawn off can be used directly as a fuel for generation of heat. The incandescent bed has a zone at which the temperature is in the range between 800° and 1000° C.

A gas mixture that contains no tar residues, or very little tar, can be produced by connecting a second cracking and cleaning stage downstream of the apparatus just described. The second stage contains a bed of incandescent coals in the same manner as in the shaft furnace just described. The incandescent bed, in this case, has a temperature between 900° and 1000° C. The gaseous products being drawn down out of the shaft furnace flow through the second incandescent bed in counter-current to the incandescent bed material downwardly sinking under the action of gravity in the second stage apparatus which may be referred to as a reduction reactor. The high molecular weight organic gas components still contained in the gas mixture are cracked in the second incandescent bed of coals. In addition, the fine ash particles carried along by the gas are held back.

The incandescent beds consist of degassed carbon-rich material, for example, of coke or of wood charcoal. A size reduction effect is obtained by the addition of grinding balls which are added to the incandescent bed in the shaft furnace.

BRIEF DESCRIPTION OF THE DRAWING

The invention is further described by way of illustrative examples with reference to the annexed drawing, in the single FIGURE of which there is schematically shown, in cross section, a shaft furnace for carrying out the method of the invention. This FIGURE shows a shaft furnace with a cracking and cleaning stage connected downstream.

DESCRIPTION OF THE ILLUSTRATED EMBODIMENT

A shaft furnace is shown in the drawing, having a shaft chamber 1 in its upper region which can be closed off gas-tight. A shaft wall 2 has a cavity below the chamber 1 for seating a grate 3 which in the illustrated example is mounted, on an arbor, rotatably about the arbor axis 4. The grate 3 is so installed in the shaft that a gap passage 5 remains between the rim of the grate 3 and the shaft wall 2. Ashes are carried out through this gap from an incandescent combustion bed 6 provided above the grate and supported by the grate. The grate 3 is constituted in conical shape. The ashes to be carried out slide down out over the conical surface to the gap passage 5. The removal of the ashes is controlled by rotation of the grate. For this purpose, the grate 3 is connected fixed to a drive arbor 7 which is rotatable stepwise through a gear drive 9 by means of a motor 8. The faster the sequence of step movements is selected, the longer extent of the steps and the greater the rotary speed of the grate are made to be, the more ashes are propelled out of the chamber 1.

Instead of a rotating grate, a swingable grate that can be swung about a cross axis running perpendicular to the shaft axis 4, can be installed. Such a grate is not shown in the drawing. In the case of a swinging grate, a gap passage formed between the rim of the grate and the shaft wall, having a gap width that can be varied by movement of the grate. The greater the angle is chosen about which the grate is deviated for swinging, the more the gap width changes between a minimum and maximum value. In this manner, the stopping up of the gap passage by the sticking of ash particles, can be counteracted. A swinging grate also has advantages for the necessary cleaning of the shaft furnace. For cleaning, the gap passage is widened to such an extent by swinging of the grate that all pieces of material present in the shaft furnace can be removed from below. If the swinging grate is prismatically shaped, the ashes to be removed from the incandescent bed will slide over an inclined plane to the outlet gap, even in the case of this type of grate.

Above the incandescent bed 6, a supply line 10 for the waste liquid discharges into the shaft chamber 1 of the shaft furnace. The supply line 10 is connected to a dosing device 11 which is connected to a storage container for the waste liquid. The storage container is not shown in the drawing. The waste liquid has organic components. In the illustrated example, what is involved are paint wastes with organic components such as solvents, thickeners or dyes, as well as inorganic additives, such as pigments or fillers. The illustrated apparatus can also treat lacquer, varnish and other finishing semi-liquids or oozes.

The dosing device 11 has a controllable liquid pump or a settable valve by which the quantity of waste liquid to be supplied to the shaft furnace can be dosed. Nozzles for spraying of the waste liquid in the shaft chamber of the incandescent bed 6 can be attached at the discharge of the supply line 10. In the illustrated case, the waste liquid is dripped in a simple way onto the incandescent bed.

For the supply of oxygen into the incandescent bed 6, the drive arbor 7 of the grate 3 is constituted as a hollow tube and at its outer end 13 projecting downwards out of the furnace, it is connected to a gas line 14 supplying oxygen. The oxygen flows in the hollow tube up to the cone vertex 15 of the grate 3 and is introduced into the incandescent bed 6 through discharge openings 17 disposed symetrically to the cone axis 16. The cone axis 16 coincides with the shaft axis 4 in the illustrated example. For this reason, the reference numeral 16 is put in parentheses next to the reference numeral 4 in the drawing. The conical grate can also be disposed in the shaft furnace so that it can be wobbled so that the width of the passage between the rim of the grate and the wall of the shaft can be locally changed by the rotation of the grate. Such wobbling can be provided with rotation by a simple small inclination of the arbor axis 16 to the shaft axis 4.

In a manner departing from what is shown in the drawing, outlet openings for oxygen can be provided, distributed not only circumferentially, but also at various heights of the conical grate. Thus, for example, oxygen can supplementarily be introduced into the incandescent bed only a little above the passage gap 5. This is particularly to be provided if the fuel gas taken out of the shaft furnace is to be directly converted and burned for heat generation.

The quantity of oxygen introduced at the cone vertex 15 is preferably so measured out that the incandescent bed temperature necessary for cracking of the gases is maintained within the shaft furnace by burning a part of the gas generated in the incandescent bed. In the illustrated example the incandescent bed is of coke which can be dropped in through a closable opening 1a at the head of the shaft. The incandescent bed has a temperature of between 800° and 1000° C. The incandescent bed temperature is to be so set that the organic products produced in the gasification of the paint waste are cracked during passage of the gas through the zone having the above-mentioned temperature. In the illustrated case, the temperature is set at from 800° to 900° C., however, because the shaft furnace has a cracking and cleaning stage 23 downstream of it operating at a higher temperature.

The gas mixture generated in the incandescent bed 6 is drawn down out of the shaft furnace by means of an outlet duct 18 in the lower region of the shaft. The gas produced therefore, flows through the shaft furnace in a stream that is concurrent with the flow of waste liquid introduced into the shaft. A blower 20 set in the outlet 19 provides the necessary suction pressure in the illustrated example. Gas mixture and ash particles are separated from each other after passage through the gap 5. The ash particles collect first on the shaft floor 12 and are then advanced with blades 12a to the outlet 18 through which they drop into an ash hopper 21, out of which they can be removed through a sluice 22.

In the illustrated example, as above mentioned, a second cracking and cleaning stage 23 is provided downstream in the shaft furnace, for cracking residual high molecular weight hydrocarbons of the gas mixture. The cracking and cleaning stage 23 likewise has an incandescent bed 24 supported on a grate 24a and bed has a temperature set in the range between 900° and 1000° C. The outlet duct 18 connected at the bottom of the shaft furnace discharges below the incandescent bed 24 into the cracking and cleaning stage vessel 23. The gas mixture thus introduced flows up to the head of this vessel and thence out again through the outlet 19. Not only are the high molecular weight organic gas components in the gas mixture cracked in the incandescent bed 24, but also a cleaning effect is obtained there. Ash particles carried along by the gas mixture are held back.

A gas mixture containing essentially hydrogen, carbon monoxide and methane, comes out of the cracking and cleaning stage 23 and can be used as a fuel gas, either immediately or, if desired, after intermediate storage in pressure tanks.

A closable fill opening 25 is located above the incandescent bed 24 for the coke which in the illustrated example serves as fuel material for the incandescent bed 24. Wood charcoal can also be used instead as a degassed carbon-rich material. Oxygen is not supplied in the illustrated example to the cracking and cleaning stage 23. This is on the basis that the oxygen supplied to the fuel gas in the shaft furnace is also sufficient for a partial combustion of the fuel of the cracking and cleaning stage 23 in order to maintain in the cracking and cleaning stage the temperature necessary for cracking of the heavy gas components. This has the result of resulting the fuel material requirement for this stage.

EXAMPLE 1

In a shaft oven of the above-described kind, having a shaft volume of 100 dm$^3$, up to 50 kg of lacquer or viscous paint was gasified per hour. The paint mud had between 40% and 50% by weight of inorganic additive materials. The temperature in the incandescent bed 6 was adjusted at about 900° C. and the temperature in the incandescent bed 24 at about 1000° C. Coke of an average piece size between 10 and 30 mm diameter was used for forming the incandescent bed.

The fuel gas drawn off at the outlet 19 had generator gas quality. The combustible gas components, such as CO, H$_2$, CH$_4$ constituted 55% by volume. A gas quantity of 250 cubic meters measured that standard conditions could be generated per hour with a heat value of 5000 kilojoules.

Oil containing and fat containing solutions come into consideration also as waste liquids with organic components, for the purposes of the invention. These waste liquids also make possible the generation of fuel gas in the same way. The method of the invention serves not only to getting rid of these liquids, but also for conservation of fossil fuels.

Although the invention has been described with preference to a particular illustrative example, it will be evident that variations and modifications are posible within the inventive concept.

I claim:

1. Method of gasifying a waste liquid having organic content, comprising the steps of,
    discharging said waste liquid from above onto an incandescent combustion bed to produce conversion of said liquid into gaseous products;
    drawing all of said gaseous products through at least one zone of said combustion bed, by suction from below said bed, to produce heating of said gaseous products;
    supplying an oxygen-containing gas to said combustion bed by discharge of said gas adjacent to said bed for maintaining partial combustion therein and maintaining, in said at least one zone of said combustion bed through which said gaseous products are drawn, a temperature which is high enough to produce cracking of high-molecular-weight organic phases among said gaseous products, and
    separating solid particles from said heated and cracked gaseous products to produce a usable fuel gas.

2. Method according to claim 1, in which said incandescent combustion bed has at least one zone for flow-through of said gaseous products which is at a temperature in the range from 800° to 1000° C.

3. Method according to claim 2, in which after said step of separating solid particles, said once heated and cracked gaseous products are subjected to a second heating and cracking step which is concurrent with a second step of separating out solid particles, said second cracking step being performed at a temperature in the range from 900° to 1000° C.

4. Method according to claim 3, in which a second incandescent combustion bed is provided and said second heating said cracking step is performed by drawing said once heated and cracked gaseous products through said second combustion bed by suction.

5. Method according to claim 1, in which a degassed carbon-rich material is used to constitute said incandescent combustion bed.

6. Method according to claim 5, in which said incandescent combustion bed has at least one zone for flow-through of said gaseous products which is at a temperature in the range from 800° to 1000° C.

7. Method according to claim 5, in which after said step of separating ash particles, said once heated and cracked gaseous products are subjected to a second heating and cracking step followed by a second step of separating out solid particles, said second cracking step being performed at a temperature in the range from 900° to 1000° C.

8. Method according to claim 4, in which a degassed carbon-rich material is used to constitute both of said incandescent combustion beds.

9. Method according to claim 8 in which milling balls are added into said material in the constitution of said incandescent combustion bed of said first cracking step for reducing the piece size of said bed.

10. Method according to claim 1, in which the step of discharging said waste liquid from above onto said incandescent combustion bed is performed by spraying said liquid onto said incandescent combustion bed.

11. Shaft furnace for gasifying waste liquid containing organic components, comprising:
    a furnace shaft having a shaft wall surrounding, in its upper region, a chamber (1) equipped with a loading inlet at the top and a gas-tight closure therefor;
    a grate (3) having a rim of a contour similar to the contour of said furnace shaft wall (2) and sufficiently smaller to provide a gap (5) between said rim and said wall (2), said grate providing the bottom boundary of said chamber (1) and being constituted in a manner for supporting an incandescent combustion bed (6);
    means for rotatably mounting said grate (3) in such a way as to facilitate removal by gravity of ash particles that are removable from said combustion bed through said gap (5);
    an incandescent combustion bed (6) supported on said grate (3);
    a supply duct (10) having at least one discharge orifice above said combustion bed for discharge of said waste liquid into said chamber and onto said combustion bed;
    means (14) for supplying a gaseous oxidizing agent to said combustion bed, and
    means (18) below said grate (3), for drawing off, at least through said gap, a gas mixture produced in said combustion bed by vaporization and gasification of said waste liquid and cracking of high molecular weight components of said gas mixture.

12. Shaft furnace according to claim 8, in which said grate and said chamber are constituted for use with a temperature of said incandescent combustion bed in the range from 800° to 1000° C.

13. Shaft furnace according to claim 11, in which a second chamber (23) is provided in the vicinity of said furnace shaft and is connected to said previously mentioned furnace shaft by said means for drawing off said gas mixture below said grate (3) in such a way that said gas mixture is caused to flow through said second chamber and means for supporting in said second chamber a second incandescent combustion bed (24) in such a manner that said gas mixture may flow through said second combustion bed and be subjected to cracking of high molecular weight components therein.

14. Shaft furnace according to claim 13, in which means are provided for separating solid particles from said gas mixture before said gas mixture is supplied to said second incandescent combustion bed (24) and said gas mixture is caused to flow upward in said second chamber through said second incandescent combustion bed, whereby solid particles carried along in said gas mixture are held back.

15. Shaft furnace according to claim 13, in which an incandescent combustion bed of degassed carbon-rich material is provided both on said grate (3) in said furnace shaft and also on said second grate in said second chamber.

16. Shaft furnace according to claim 15, in which said incandescent combustion bed in said furnace shaft includes an addition thereto of grinding balls for reducing the size of pieces of said carbon-rich material.

* * * * *